US 6,671,998 B1

(12) United States Patent
Lawrence, Sr.

(10) Patent No.: US 6,671,998 B1
(45) Date of Patent: Jan. 6, 2004

(54) RODENT REMOVAL DEVICE

(76) Inventor: Glenn W. Lawrence, Sr., 34 Colby Ave., Crimora, VA (US) 24431

( * ) Notice: Subject to any disclaimer, the term of this patent is extended or adjusted under 35 U.S.C. 154(b) by 0 days.

(21) Appl. No.: 10/314,463

(22) Filed: Dec. 9, 2002

(51) Int. Cl.$^7$ ............................................. A01M 23/08
(52) U.S. Cl. .................................................... 43/58
(58) Field of Search .................................. 43/58, 61

(56) References Cited

U.S. PATENT DOCUMENTS

| 3,591,972 A | * | 7/1971 | Hess | 43/58 |
|---|---|---|---|---|
| 4,464,859 A | * | 8/1984 | Gompers | 43/58 |
| 4,566,218 A | * | 1/1986 | Kurosawa et al. | 43/58 |
| 4,653,221 A | | 3/1987 | Pratscher | |
| 4,787,170 A | | 11/1988 | Kingsbury et al. | |
| 4,965,959 A | * | 10/1990 | Gagne | 43/61 |
| 5,341,592 A | * | 8/1994 | Lafforthun | 43/66 |
| 5,452,539 A | * | 9/1995 | Kurosawa et al. | 43/58 |
| 5,611,171 A | * | 3/1997 | Hershey | 43/66 |
| 5,943,813 A | * | 8/1999 | Wang | 43/61 |
| 5,953,853 A | | 9/1999 | Kim | |
| 6,510,647 B2 | * | 1/2003 | Cairns | 43/69 |

FOREIGN PATENT DOCUMENTS

JP 05023090 A * 2/1993 .......... A01M/23/08

* cited by examiner

Primary Examiner—Charles T. Jordan
Assistant Examiner—Kimberly S. Smith

(57) ABSTRACT

A rodent removal device for directing a rodent away from a dwelling includes an elongated tubular member having a first end and a second end. The first end is open. An opening extends into the tubular member. A cover is positionable over the opening. The cover has an inner surface having a coupling member attached thereto. A scented material may be releasably attached to the coupling member. A plurality of conduits is fluidly coupled to and extends outwardly from the tubular member. Each of the conduits has an open free end. A plurality of door assemblies selectively opens or closes the conduits. Each of the assemblies is mounted in one of the conduits. The tubular member may be positioned along an upper edge of a wall of the dwelling. A rodent may enter one of the conduits and may exit only through the first end of the tubular member.

9 Claims, 2 Drawing Sheets

RODENT REMOVAL DEVICE

BACKGROUND OF THE INVENTION

1. Field of the Invention

The present invention relates to rodent traps and more particularly pertains to a new rodent trap for providing a user with an improved method of controlling rodents.

2. Description of the Prior Art

The use of rodent traps is known in the prior art. U.S. Pat. No. 4,787,170 describes a mousetrap that traps a mouse and kills it by asphyxiation rather than trauma or poison. Another type of rodent trap is U.S. Pat. No. 5,953,853 describes a mouse and rattrap that can be used to kill rodents in a humane way. U.S. Pat. No. 4,653,221 describes an animal trap for exterminating rodents.

While these devices fulfill their respective, particular objectives and requirements, the need remains for a system that includes relocating rodents with little or no intervention from humans.

SUMMARY OF THE INVENTION

The present invention meets the needs presented above by enticing a rodent to enter one of the conduits and thus being trapped inside the tubular member with the only exit being outside of the dwelling.

Another object of the present invention is to provide a new rodent trap that would eliminate the need for poison or potentially dangerous spring-loaded levers, it could be safe for use around children or pets.

Still another object of the present invention is to provide a new rodent trap that would eliminate the need to handle dead rodents or finding a means of killing or relocating them.

To this end, the present invention generally comprises an elongated tubular member having a first end and a second end. The first end is open and the second end is closed. An opening extends into the tubular member. A cover is positionable over the opening for selectively opening or closing the opening. The cover has an inner surface having a coupling member attached thereto. A scented material may be releasably attached to the coupling member. A plurality of conduits is fluidly coupled to and extends outwardly from the tubular member. Each of the conduits has an open free end. A plurality of door assemblies selectively opens or closes the conduits. Each of the assemblies is mounted in one of the conduits. The tubular member may be positioned along an upper edge of a wall of a dwelling. A rodent may enter one of the conduits and may exit only through the first end of the tubular member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty, which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
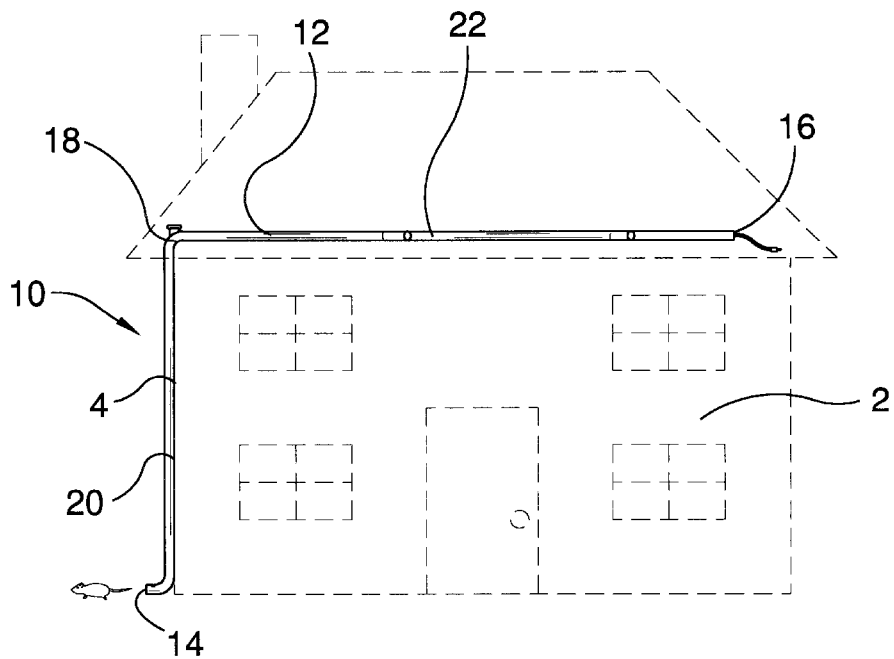
FIG. 1 is an in-use view of a rodent removal device according to the present invention.
Figure 2:
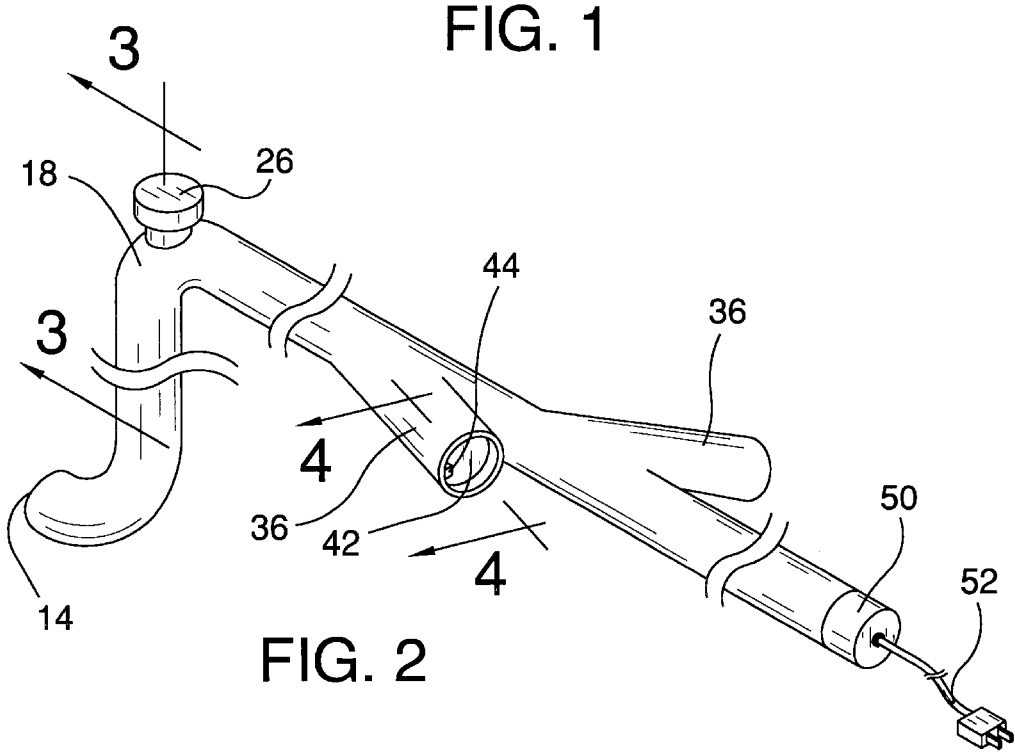
FIG. 2 is a perspective view of the present invention.
Figure 3:
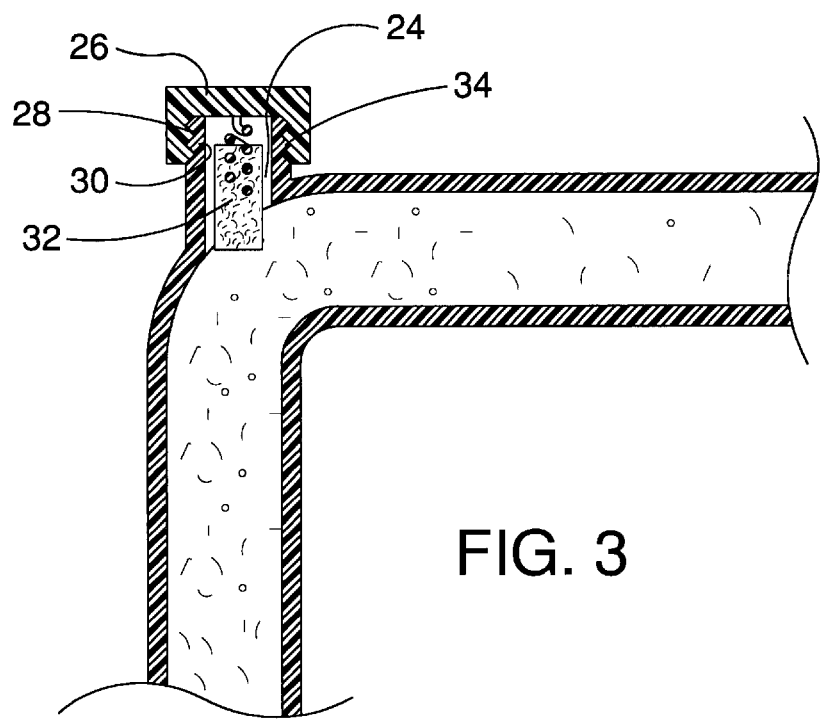
FIG. 3 is a cross-sectional view taken along the line 3—3 of FIG. 2 of the present invention.
Figure 4:
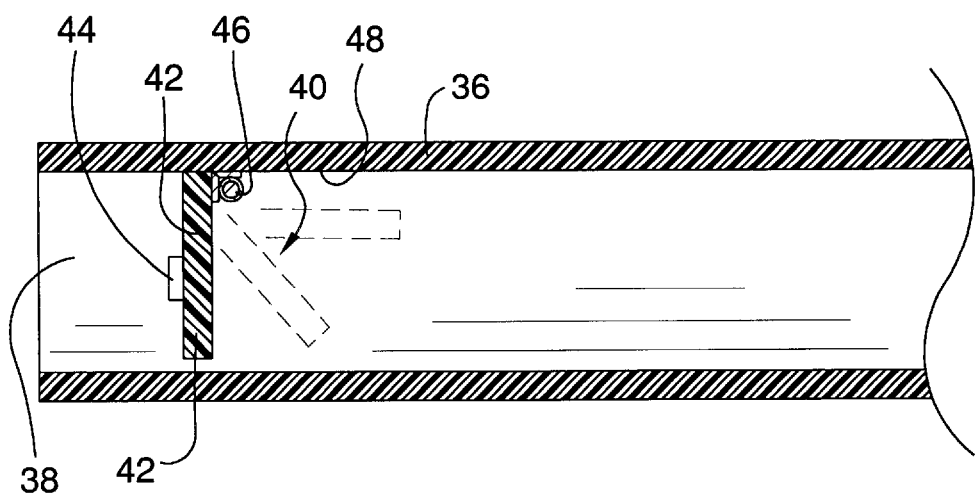
FIG. 4 is a cross-sectional view taken along the line 4—4 of FIG. 2 of the present invention.

With reference now to the drawings, and in particular to FIGS. 1 through 4 thereof, a new rodent trap embodying the principles and concepts of the present invention and generally designated by the reference numeral 10 will be described.

As best illustrated in FIGS. 1 through 4, the rodent removal device 10 generally comprises a system, which may be removably positioned on a dwelling 2. The system includes an elongated tubular member 12 having a first end 14 and a second end 16. The first end 14 is open. The elongated tubular member 12 has a bend 18 therein positioned generally between the first 14 and second 16 ends such that a first portion 20 adjacent to the first end 14 and a second portion 22 adjacent to the second end 16 are defined on either side of the bend 18. The tubular member 12 preferably comprises a substantially rigid material such as PVC pipe.

An opening 24 extends into the tubular member 12. Preferably, the opening 24 is positioned generally adjacent to the bend 18. A cover 26 is positionable over the opening 24 for selectively opening or closing the opening 24. The cover 26 has an inner surface 28 having a coupling member 30 attached thereto. The coupling member 30 preferably comprises a spiral screw 34. A scented material 32 may be releasably attached to the coupling member 30. The scented material 32 is preferably a portion of cork impregnated with a scent, such as cheese or other food. Alternatively, food may be positioned on the spiral screw 34.

A plurality of conduits 36 is fluidly coupled to and extends outwardly from the tubular member 12. Each of the conduits 36 has an open free end 38 which acts as an entrance into the tubular member 12 for a rodent. The conduits 36 are preferably positioned on the second portion 22 of the tubular member 12 and are angled such that they are directed generally toward the bend 18.

A plurality of door assemblies 40 selectively opens or closes the conduits 36. Each of the assemblies 40 is mounted in one of the conduits 36. Each of the assemblies 40 is adapted for opening inward of the conduit 36. The door assemblies 40 include a door 42, a stop 44 and a biasing member 46. The door 42 is pivotally mounted in the conduit 36 such that the door 42 is positionable between an open position extending inward and a closed position. The stop 44 prevents the door 42 from pivoting beyond the closed position and toward the free end 38 of the conduit 36. The door stop 44 is attached to an inner surface 48 of the conduit 36 and positioned between the door 42 and the free end 38. The biasing member 46 is attached to the inner surface 48 and the door 42 for biasing the door 42 against the stop 44. The biasing member 46 is preferably a spring. As the door 42 only opens one way, it allows the rodent to push against the door 42 to enter the conduit 36 but prevents the rodent from leaving the conduit 36 through the free end 38.

Ideally, the second end 16 of the tubular member 12 comprises a sound emitting device 50. The sound emitting device 50 is adapted for intermittently emitting a sound into the tubular member 12. Ideally, the sound is high-pitched sound that may be heard by rodents but is outside the hearing range of humans. A built in timer causes the device to make the high pitched sound intermittently so that it frightens the rodent toward the first end 14 when it is in the tubular member 12. The sound emitting device 50 does not emit sound continuously so that a rodent is not frightened from entering the conduit 36. The sound emitting device 50 may have a battery for a power supply or a cord 52.

In use, the second portion 22 of the tubular member 12 is positioned along an upper edge of a wall 4 of the dwelling 2 such that the first portion 20 extends toward a ground surface. The conduits 36 are positioned along the roof line 6 and may be extended into the wall. The scented material 32 draws the rodent into the conduit 36 where it becomes trapped in the tubular member 12. The door 42 does not make an airtight seal to ensure the scent moves outward of the conduit 36. Once inside, the rodent's only exit is through the first end 14 of the tubular member 12 which directs it away from the house.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rodent removal system for removably positioning on a dwelling, said system comprising:
   an elongated tubular member having a first end and a second end, said first end being open, said elongated tubular member having a bend therein positioned generally between said first and second ends such that a first portion adjacent to said first end and a second portion adjacent to said second end are defined on either side of said bend, said second portion being positioned along the upper edge of the wall such that said first portion extends downward toward a ground surface;
   an opening extending into said tubular member;
   a cover being positionable over said opening for selectively opening or closing said opening, said cover having an inner surface having a coupling member attached thereto, wherein a scented material may be releasably attached to said coupling member;
   a plurality of conduits being fluidly coupled to and extending outwardly from said tubular member, each of said conduits having an open free end;
   a plurality of door assemblies for selectively opening or closing said conduits, each of said assemblies being mounted in one of said conduits; and
   wherein said tubular member is positioned along an upper edge of a wall of the dwelling, wherein a rodent may enter one of said conduits and may exit only through said first end of said tubular member.

2. The rodent removal system as in claim 1, wherein said tubular member comprises a substantially rigid material.

3. The rodent removal system as in claim 1, wherein said opening is positioned generally adjacent to said bend.

4. The rodent removal system as in claim 1, wherein said coupling member comprises a spiral screw.

5. The rodent removal system as in claim 1, wherein each of said conduits is positioned on said second portion of said tubular member.

6. The rodent removal system as in claim 5, wherein each of said door assemblies includes:
   a door being pivotally mounted in said conduit such that said door is positionable between an open position extending inward and a closed position;
   a stop for preventing said door from pivoting beyond said closed position and toward the free end of said conduit, said door stop being attached to an inner surface of said conduit and positioned between said door and said free end; and
   a biasing member being attached to said inner surface and said door for biasing said door against said stop.

7. The rodent removal system as in claim 1, wherein each of said door assemblies includes:
   a door being pivotally mounted in said conduit such that said door is positionable between an open position extending inward and a closed position;
   a stop for preventing said door from pivoting beyond said closed position and toward the free end of said conduit, said door stop being attached to an inner surface of said conduit and positioned between said door and said free end; and
   a biasing member being attached to said inner surface and said door for biasing said door against said stop.

8. The rodent removal system as in claim 1, wherein said second end of said tubular member comprises a sound emitting device, said sound emitting device being adapted for intermittently emitting a sound into said tubular member.

9. A rodent removal system for removably positioning on a dwelling, said system comprising:
   an elongated tubular member having a first end and a second end, said first end being open, said elongated tubular member having a bend therein positioned generally between said first and second ends such that a first portion adjacent to said first end and a second portion adjacent to said second end are defined on either side of said bend, said tubular member comprising a substantially rigid material;
   an opening extending into said tubular member, said opening being positioned generally adjacent to said bend;
   a cover being positionable over said opening for selectively opening or closing said opening, said cover having an inner surface having a coupling member attached thereto, wherein a scented material may be releasably attached to said coupling member, said coupling member comprising a spiral screw;
   a plurality of conduits being fluidly coupled to and extending outwardly from said tubular member, each of said conduits having an open free end, each of said conduits being positioned on said second portion of said tubular member;

a plurality of door assemblies for selectively opening or closing said conduits, each of said assemblies being mounted in one of said conduits, each of said assemblies being adapted for opening inward of said conduit, each of said door assemblies including;
- a door being pivotally mounted in said conduit such that said door is positionable between an open position extending inward and a closed position;
- a stop for preventing said door from pivoting beyond said closed position and toward the free end of said conduit, said door stop being attached to an inner surface of said conduit and positioned between said door and said free end;
- a biasing member being attached to said inner surface and said door for biasing said door against said stop;

said second end comprising a sound emitting device, said sound emitting device being adapted for intermittently emitting a sound into said tubular member; and wherein the second portion of said tubular member is positioned along an upper edge of a wall of the dwelling such that said first portion extends toward a ground surface, wherein a rodent may enter one of said conduits and may exit only through said first end of said tubular member.

* * * * *